(12) United States Patent
Kim et al.

(10) Patent No.: US 8,998,350 B2
(45) Date of Patent: Apr. 7, 2015

(54) PRESSURE DAMPING DEVICE FOR BRAKE SYSTEM

(71) Applicants: Yong Kap Kim, Suwon-si (KR); Hyun Jun Kim, Suwon-si (KR)

(72) Inventors: Yong Kap Kim, Suwon-si (KR); Hyun Jun Kim, Suwon-si (KR)

(73) Assignee: Mando Corporation, Pyungteak-Si, Gyeonggi-Do (KR)

( * ) Notice: Subject to any disclaimer, the term of this patent is extended or adjusted under 35 U.S.C. 154(b) by 116 days.

(21) Appl. No.: 13/773,536

(22) Filed: Feb. 21, 2013

(65) Prior Publication Data

US 2013/0220463 A1    Aug. 29, 2013

(30) Foreign Application Priority Data

Feb. 22, 2012    (KR) .................. 10-2012-0017908

(51) Int. Cl.

| F16L 55/04 | (2006.01) |
|---|---|
| F16L 51/00 | (2006.01) |
| F16L 55/053 | (2006.01) |

(52) U.S. Cl.
CPC ............... *F16L 51/00* (2013.01); *F16L 55/053* (2013.01)

(58) Field of Classification Search
CPC .............................. B60T 8/4048; F16L 55/053
USPC ......... 303/87, 116.1, 116.4, DIG. 8, DIG. 10; 138/30, 31; 417/540, 543
See application file for complete search history.

(56) References Cited

U.S. PATENT DOCUMENTS

| 3,487,855 | A | * | 1/1970 | Lautenberger | .................. 138/31 |
| 4,548,713 | A | * | 10/1985 | Schmid | ....................... 210/198.2 |
| 4,629,562 | A | * | 12/1986 | Kercher | .......................... 138/30 |
| 4,989,924 | A | * | 2/1991 | Toda et al. | ................. 303/116.1 |
| 5,385,395 | A | * | 1/1995 | Volz | ................................. 303/87 |
| 5,567,022 | A | * | 10/1996 | Linkner, Jr. | ..................... 303/87 |
| 5,803,555 | A | * | 9/1998 | Schaefer | .......................... 303/87 |
| 6,231,132 | B1 | * | 5/2001 | Watanabe | ......................... 303/87 |
| 6,669,309 | B1 | * | 12/2003 | Gierer et al. | .................... 303/87 |
| 7,093,911 | B2 | * | 8/2006 | Hool et al. | ................. 303/113.5 |

(Continued)

FOREIGN PATENT DOCUMENTS

| JP | 06191387 A | * | 7/1994 |
| JP | 06199216 A | * | 7/1994 |

(Continued)

OTHER PUBLICATIONS

Machine Translastion JP 06-191387 A, Jul. 1994.*
Office action dated Jul. 15, 2013 from corresponding Korean Patent Application No. 10-2012-0017908 and its English translation by Google Translate.

*Primary Examiner* — Thomas J Williams
(74) *Attorney, Agent, or Firm* — Ladas & Parry, LLP

(57) ABSTRACT

Disclosed is a pressure damping device for a brake system. The pressure damping device is installed at the brake system having a hydraulic block provided with a first hydraulic circuit to control transfer of fluid pressures generated by a first port of a master cylinder and discharged from a first pump to a first wheel, and a second hydraulic circuit to control transfer of fluid pressures generated by a second port of the master cylinder and discharged from a second pump to a second wheel, and the hydraulic block includes a bore connecting the master cylinder with discharge outlets of the first and second pumps and formed between first and second main oil paths to communicate with the first and second main oil paths, and a pressure damping unit provided in the bore and having a volume changed according to the fluid pressures from the first and second pumps.

2 Claims, 3 Drawing Sheets

(56) References Cited

U.S. PATENT DOCUMENTS

| | | | |
|---|---|---|---|
| 8,789,895 B2 * | 7/2014 | Park | 303/87 |
| 2012/0025599 A1 * | 2/2012 | Park | 303/6.01 |
| 2012/0049616 A1 * | 3/2012 | Park | 303/9.62 |
| 2013/0269815 A1 * | 10/2013 | Lee | 138/31 |
| 2013/0269816 A1 * | 10/2013 | Lee | 138/31 |

FOREIGN PATENT DOCUMENTS

| | | |
|---|---|---|
| KR | 10-2012-0011183 | 2/2012 |
| KR | 10-2012-0011930 | 2/2012 |

\* cited by examiner

PRESSURE DAMPING DEVICE FOR BRAKE SYSTEM

CROSS-REFERENCE TO RELATED APPLICATION(S)

This application claims the benefit of Korean Patent Application No. 2012-0017908, filed on Feb. 22, 2012 in the Korean Intellectual Property Office, the disclosure of which is incorporated herein by reference.

BACKGROUND

1. Field

Embodiments of the present invention relate to a pressure damping device for a brake system which minimizes pressure pulsations to increase brake fluid pressure supplied to a wheel cylinder in braking.

2. Description of the Related Art

Recently, various systems have been proposed to provide stronger and more stable braking force to a vehicle equipped with a brake system to perform braking. Examples of braking systems include an anti-lock brake system (ABS), which prevents slippage of a wheel when braking a vehicle, a brake traction control system (BTCS), which prevents slippage of drive wheels during sudden start or sudden acceleration, and an electronic stability control (ESC) system, which maintains a vehicle in a stable condition of driving by controlling brake fluid pressure with a combination of the ABS and the BTCS.

FIG. 1 is a view illustrating a conventional brake system. With reference to FIG. 1, the brake system includes a brake pedal 10 to receive operational force from a driver, a brake booster 11 to boost the effort on the brake pedal 10 using the pressure difference between vacuum pressure and atmospheric pressure made by the effort on the brake pedal 10, a master cylinder 20 to generate pressure through the brake booster 11, a first hydraulic circuit 40A to connect a first port 21 of the master cylinder 20 and two wheel cylinders 30 to control transfer of fluid pressure, and a second hydraulic circuit 40B to connect a second port 22 of the master cylinder 20 and the other two wheel cylinders 30 to control transfer of fluid pressure. The first hydraulic circuit 40A and the second hydraulic circuit 40B are arranged in a compact form in a hydraulic block 40.

Each of the first hydraulic circuit 40A and the second hydraulic circuit 40B includes solenoid valves 41 and 42 to control brake oil pressure transferred to two wheel brakes 30, a pump 44 to draw in oil from the wheel brakes 30 or the master cylinder 20 and pump the oil out, an low pressure accumulator 43 allowing the oil from the wheel brakes 30 to be temporarily stored therein, an orifice 46 to reduce pressure pulsations in fluid pressure pumped out by the pump 44, and an auxiliary oil path 48a to guide the oil from the master cylinder 20 such that the oil is drawn into the inlet of the pump 44.

The solenoid valves 41 and 42, which are connected with the upstream and downstream of the wheel brakes 30, are divided into Normally Open-type solenoid valves 41, which are disposed upstream of the respective wheel brakes 30 and kept open in normal times, and Normally Closed-type solenoid valves 42, which are disposed downstream of the respective wheel brakes 30 and kept closed in normal times. Opening and closing of the solenoid valves 41 and 42 are controlled by an electric control unit (ECU) (not shown), which senses the speed of the vehicle through wheel speed sensors disposed at the respective wheels, and according to braking with pressure reduction, the Normally Closed-type solenoid valves 42 are opened and oil from the wheel brakes 30 are temporarily stored in the low pressure accumulator 43.

The pump 44 is driven by a motor 45 to draw in the oil stored in the low pressure accumulator 43 and discharge the oil to the orifice 46 so as to transfer the fluid pressure to the wheel brakes 30 or the master cylinder 20.

Also, a main oil path 47a connecting the master cylinder 20 and the discharge outlet of the pump 44 to each other is provided with the orifice 46 and a Normally Open-type solenoid valve 47 for control of a TCS (hereinafter, referred to as a TC valve) is installed at the main oil path 47a. The TC valve 47 is kept open in normal times, such that, in normal braking through the brake pedal 10, the brake fluid pressure formed in the master cylinder 20 is transferred to the wheel cylinders 30 through the main oil path 47a.

The auxiliary oil path 48a, which branches from the main oil path 47a to guide the oil from the master cylinder 20 to the inlet of the pump 44 through which the oil is drawn in, is provided with a shuttle valve 48 allowing the oil to flow only into the inlet of the pump 44 installed therein. The shuttle valve 48, which operates electrically, is installed in the middle of the auxiliary oil path 48a such that it is kept closed in normal times and opened in the TCS mode.

Reference numeral 49 represents a check valve installed at a proper position in the oil path, and reference numeral 50 represents a pressure sensor to sense brake pressure transferred to the TC valve 47 and the shuttle valve 48.

In the brake system as above, pressure pulsations are generated in the fluid pressure pumped by the pump 44 according to operation of the motor 45 in braking. If a special change occurs, the pressure pulsations are reduced. Reduction of the pressure pulsations reduces torque transmitted to the motor 45, and consequently increases the rotational speed of the motor 45, thereby enhancing the rate of increase in pressure. That is, increase in pressure may allow quick transfer of the fluid pressure to the wheel brakes 30 to ensure stable braking.

The conventional brake system has the orifice 46 in the main oil path 47a to reduce pressure pulsations generated in the fluid pressure discharged from the pump 44, but it may not ensure smooth attenuation of the pressure pulsations as only the orifice 46 is provided to reduce the pressure pulsations.

SUMMARY

Therefore, it is an aspect of the present invention to provide a pressure damping device for a brake system which may reduce pressure pulsations generated by fluid pressure discharged from a pump, by providing an air damping space at the outlet of the pump such that the volume of the space varies according to pressure.

Additional aspects of the invention will be set forth in part in the description which follows and, in part, will be obvious from the description, or may be learned from practice of the invention.

In accordance with one aspect of the present invention, a pressure damping device for a brake system is installed at the brake system having a hydraulic block provided with a first hydraulic circuit to control transfer of a fluid pressure generated by a first port of a master cylinder and a fluid pressure discharged from a first pump to at least one first wheel, and a second hydraulic circuit to control transfer of a fluid pressure generated by a second port of the master cylinder and a fluid pressure discharged from a second pump to at least one second wheel, wherein the hydraulic block includes a bore adapted connecting the master cylinder with a discharge outlet of each of the first and second pumps and formed between first and second main oil paths having an orifice to communicate with each of the first and second main oil paths, and a pressure damping unit provided in the bore and having a volume changed according to the fluid pressures discharged from the first and second pumps, wherein the pressure damping unit includes at least two damping members installed at one end of the bore, each of the damping members being provided with a concave portion having opposite sides grooved toward a center thereof, and a stopper member installed at the other end of the bore to seal the bore, wherein the damping members are elastically deformed, and an air damping space is formed between the damping members such that a volume of the air damping space changes according to the fluid pressures discharged from the first and second pumps, wherein a support plate to support the elastically deformed damping members is interposed between the damping members.

The support plate may be provided with a through hole communicating with the air damping space formed by the concave portions of the damping members.

The stopper member may be provided with an oil path to connect the fluid pressure discharged from the second pump with the second main oil path and the damping members.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
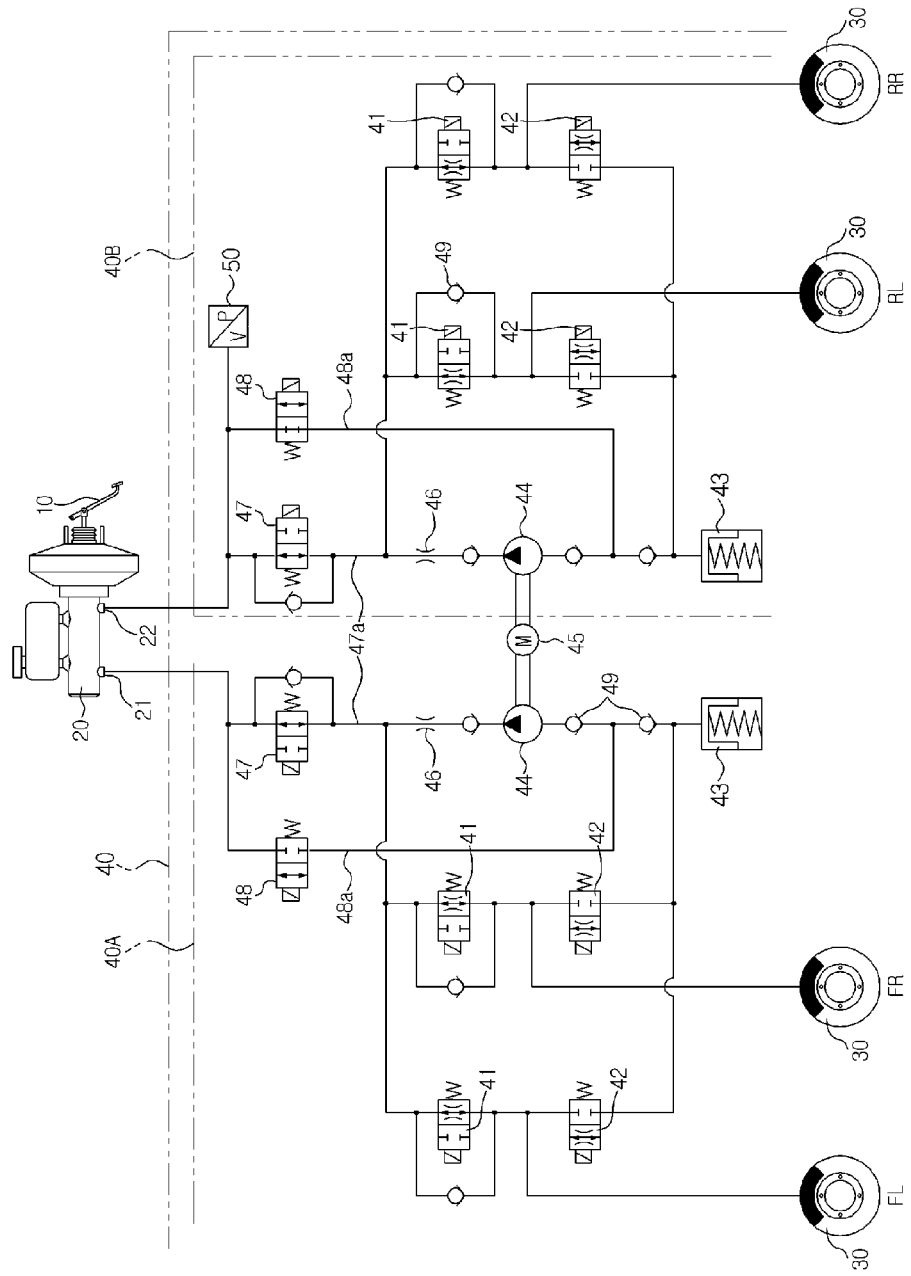
FIG. 1 is a view schematically illustrating a conventional brake system.

Reference will now be made in detail to the embodiments of the present invention, examples of which are illustrated in the accompanying drawings, wherein like reference numerals refer to like elements throughout. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The embodiments described in the specification and shown in the drawings are purely illustrative and are not intended to represent all aspects of the invention, such that various equivalents and modifications may be made without departing from the spirit of the invention.

Figure 2:
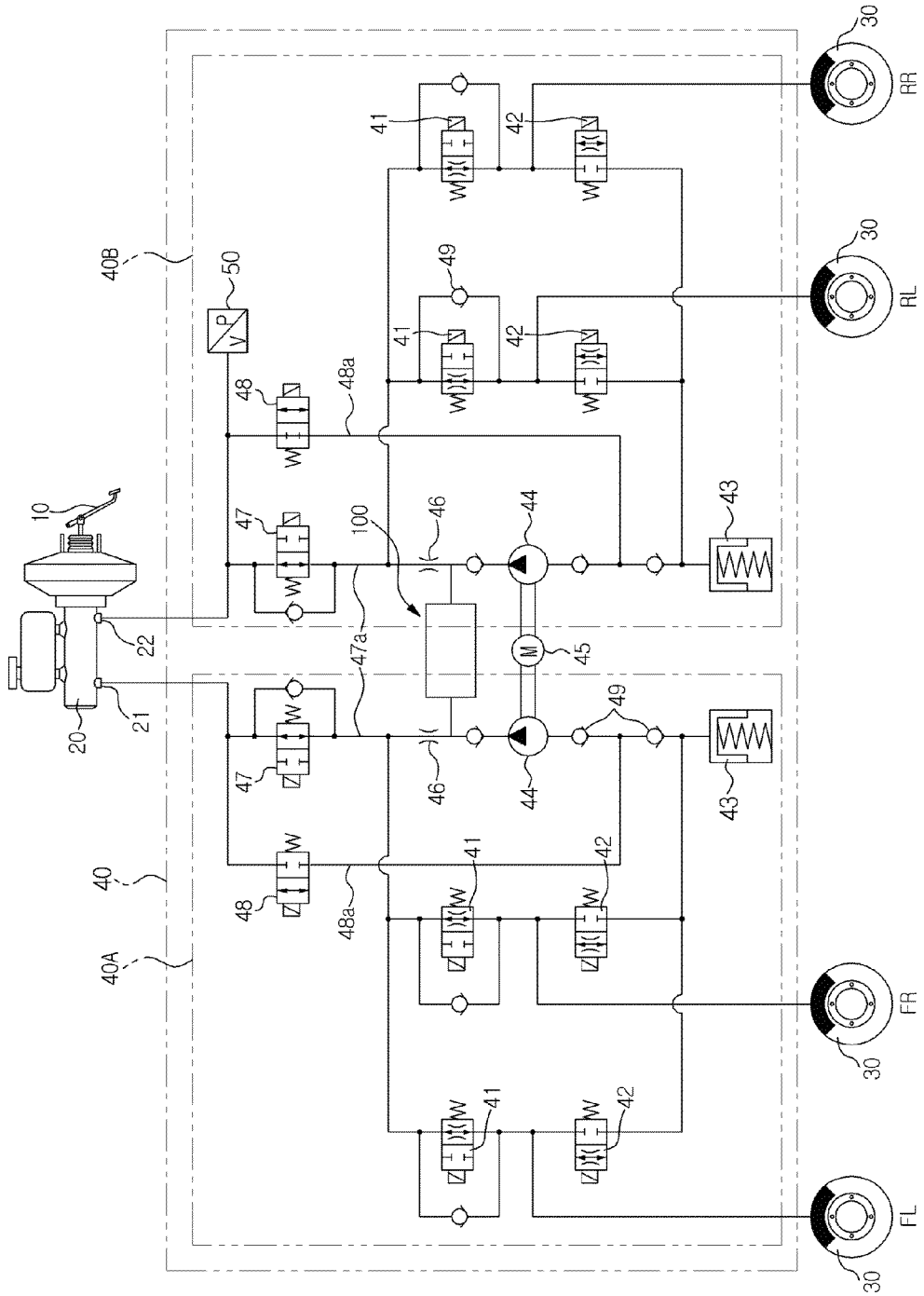
FIG. 2 is a view illustrating a brake system provided with a pressure damping device according to an exemplary embodiment of the present invention.
Figure 3:
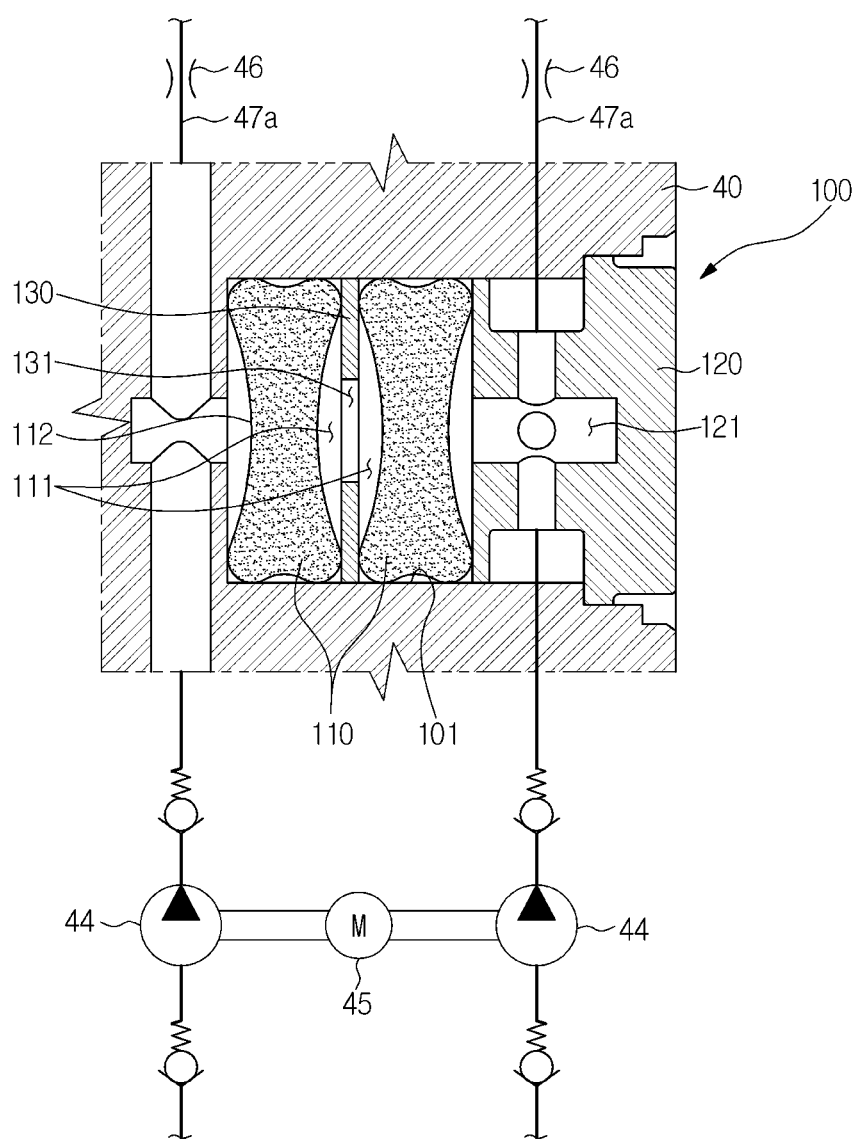
FIG. 3 is a cross-sectional view illustrating main parts of the pressure damping device for the brake system in accordance with the exemplary embodiment of the present invention.

FIG. 2 is a view illustrating a brake system provided with a pressure damping device according to an exemplary embodiment of the present invention, and FIG. 3 is a cross-sectional view illustrating main parts of the pressure damping device for the brake system.

With reference to FIGS. 2 and 3, the brake system includes a brake pedal 10 to receive operational force from a driver, a brake booster 11 to boost effort on the brake pedal 10 using the pressure difference between vacuum pressure and atmospheric pressure made by the effort on the brake pedal 10, a master cylinder 20 to generate pressure through the brake booster 11, a first hydraulic circuit 40A to connect a first port 21 of the master cylinder 20 and a wheel cylinders 30 of at least one first wheel FL and FR to control transfer of fluid pressure, and a second hydraulic circuit 40B to connect a second port 22 of the master cylinder 20 and a wheel cylinder 30 of at least one second wheel RL and RR to control transfer of fluid pressure. The first hydraulic circuit 40A and the second hydraulic circuit 40B are arranged in a compact form in a hydraulic block 40.

The first hydraulic circuit 40A and the second hydraulic circuit 40B include a plurality of solenoid valves 41, 42, 47 and 48 to control brake oil pressure transferred to wheel cylinders 30 of first and second wheels FL, FR, RL and RR, a pair of low pressure accumulators 43 allowing oil from the wheel brakes 30 to be temporarily stored therein, a motor 45 and first and second pumps 44 to draw in oil from the low pressure accumulators 43 or the master cylinder 20 and forcibly pump the oil, first and second main oil paths 47a having an orifice 46 installed therein to reduce pressure pulsations in fluid pressure pumped by the two pumps 44 and connecting discharge outlets of the two pumps 44 with the master cylinder 20, auxiliary oil paths 48a to guide the oil from the master cylinder 20 such that the oil is drawn into inlets of the two pumps 44, a plurality of check valves 49 to prevent reverse flow of the oil, and an electric control unit (ECU) (not shown) to control actuation of the solenoid valves 41, 42, 47 and 48 and the motor 45.

Reference numerals identical to those for the conventional brake system shown in FIG. 1 indicate the same members having the same functions, and thus a detailed description thereof will be omitted. That is, the illustrated embodiment of the present invention provides a pressure damping device 100 with the outlets of the two pumps 44 connected to each other to reduce pressure pulsation.

According to the illustrated embodiment of the present invention, when the pressure in the two hydraulic circuits 40A and 40B is increased at the same time in the ESC mode of braking, the pressure damping device 100 functions to minimize pressure pulsations. In more detail, the pressure damping device 100 is provided with a pressure damping unit installed at a bore 101 formed in a hydraulic block 40. The bore 101 is formed between the first and second main oil paths 47a to communicate with each of the main oil paths 47a.

The pressure damping unit is provided with a damping member 110 installed at one end of the bore 101, i.e., at a portion of the bore 101 in proximity to the first main oil path 47a of the first hydraulic circuit 40A, and a stopper member 120 installed at the other end of the bore 101, i.e., a portion of the bore 101 in proximity to the second main oil path 47a of the second hydraulic circuit 40B.

At least two damping members 110 are provided. FIGS. 2 and 3 show that two damping members 110 are installed, but the number of the damping members 110 may be increased according to the length of the bore 101 and by a user. Hereinafter, a description will be provided of the case in which two damping members 110 are installed. Each of the damping members 110 is provided with a concave portion 112 having opposite sides grooved toward the center of the concave portion 112. That is, the damping members 110 are formed in a concave lens shape. Thereby, a predetermined space, i.e., an air damping space 111 is defined by the concave portion 112 of the damping member 110.

The air damping space 111, which is provided to reduce pressure pulsations generated by the fluid pressure discharged from the discharge outlet of the pumps 44, allows the volume thereof to change according to pressure. Thereby, the damping members 110 are elastically deformed to allow pressure pulsations generated between the hydraulic circuits 40A and 40B to be cancelled by the air damping spaces 111.

The stopper member 120 functions to seal the bore 101. Also, the stopper member 120 is provided with an oil path 121 connecting the discharge outlet of the pump 44 to the second main oil path 47a and the damping member 110 to transfer fluid pressure discharged from the pump 44 to the second main oil path 47a and the damping member 110. That is, the fluid pressure discharged from the second pump 44 flows to the orifice 46 through the second main oil path 47a, and the pressure pulsation generated by the fluid pressure is reduced by the damping member 110.

In addition, a support plate 130 is interposed between the two damping members 110, which are elastically deformed to reduce pressure pulsations, to minimize warping of the damping members 110 to ensure stable operation of the damping members 110. The support plate 130 is provide with a through hole 131 communicating with the air damping space 111 formed by the concave portions 112 of the damping members 110 to cancel pressure pulsations transferred from the two damping members 110.

A brake system equipped with the pressure damping device 100 having the structure as above may effectively reduce pressure pulsation to decrease torque transmitted to the motor 45, compared to conventional brake systems, which do not have the pressure damping device 100. As a result, the rate of increase in pressure is enhanced with increase in the rotational speed of the motor 45, and thereby the brake fluid pressure in the wheel cylinder 30 of each wheel may rapidly increase, ensuring vehicle stability.

As is apparent from the above description, a pressure damping device for a brake system according to embodiments of the present invention may ensure vehicle stability by forming, at the outlet of a pump, an air damping space whose volume changes according to fluid pressure to reduce pressure pulsation and thereby rapidly increase brake fluid pressure of the wheel cylinders.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pressure damping device for a brake system, the pressure damping device being installed at the brake system comprising:
    a hydraulic block provided with a first hydraulic circuit to control transfer of a fluid pressure generated by a first port of a master cylinder and a fluid pressure discharged from a first pump to at least one first wheel, and
    a second hydraulic circuit to control transfer of a fluid pressure generated by a second port of the master cylinder and a fluid pressure discharged from a second pump to at least one second wheel,
    wherein the hydraulic block includes a bore adapted connecting the master cylinder with a discharge outlet of each of the first and second pumps and formed between first and second main oil paths having an orifice to communicate with each of the first and second main oil paths, and a pressure damping unit provided in the bore and having a volume changed according to the fluid pressures discharged from the first and second pumps,
    wherein the pressure damping unit comprises:
        at least two damping members installed at one end of the bore, each of the damping members being provided with a concave portion having opposite sides grooved toward a center thereof; and
        a stopper member installed at the other end of the bore to seal the bore,
    wherein the damping members are elastically deformed, and an air damping space is formed between the damping members such that a volume of the air damping space changes according to the fluid pressures discharged from the first and second pumps,
    wherein a support plate to support the elastically deformed damping members is interposed between the damping members, and
    wherein the stopper member is provided with an oil path to connect the fluid pressure discharged from the second pump with the second main oil path and the damping members.

2. The pressure damping device according to claim 1, wherein the support plate is provided with a through hole communicating with the air damping space formed by the concave portions of the damping members.

* * * * *